US007236776B2

(12) United States Patent
Nath et al.

(10) Patent No.: US 7,236,776 B2
(45) Date of Patent: Jun. 26, 2007

(54) METHOD FOR AUTOMOBILE SAFE WIRELESS COMMUNICATIONS

(75) Inventors: Sanjeev Nath, New York, NY (US); Rajesh Patel, Rocky Hill, CT (US)

(73) Assignee: Nattel Group, Inc., New York, NY (US)

( * ) Notice: Subject to any disclaimer, the term of this patent is extended or adjusted under 35 U.S.C. 154(b) by 0 days.

(21) Appl. No.: 11/435,643

(22) Filed: May 17, 2006

(65) Prior Publication Data

US 2006/0217161 A1 Sep. 28, 2006

Related U.S. Application Data

(63) Continuation of application No. 10/673,725, filed on Sep. 29, 2003, now Pat. No. 7,065,349.

(51) Int. Cl.
*H04M 3/00* (2006.01)
(52) U.S. Cl. .................... 455/419; 455/41.2; 455/418; 455/569.2
(58) Field of Classification Search ............ 455/569.2, 455/41.2, 345, 418, 419, 420, 456.4; 340/438, 340/463; 701/36
See application file for complete search history.

(56) References Cited

U.S. PATENT DOCUMENTS 3,034,287 A    5/1962   Odom et al.
3,955,560 A    5/1976   Stein et al.
4,031,991 A    6/1977   Malott
4,137,520 A    1/1979   Deveau
4,183,203 A    1/1980   Maezawa et al.
4,742,573 A    5/1988   Popovic
4,837,568 A    6/1989   Snaper
5,204,670 A    4/1993   Stinton
D355,903 S     2/1995   Pollack et al.
6,052,065 A    4/2000   Glover
6,114,960 A    9/2000   Gilmour
6,687,497 B1 * 2/2004   Parvulescu et al. ......... 455/420
6,690,956 B2 * 2/2004   Chua et al. ............... 455/569.2
2002/0070852 A1 * 6/2002 Trauner et al. ............. 340/438

FOREIGN PATENT DOCUMENTS

EP          1035746 A1 *    9/2000

OTHER PUBLICATIONS

Infrared Data Association, "Point and Shoot Profile," Version 1.1, Mar. 20, 2000 from www.irda.org.
Polgreen, Lydia, New York Times, "To Get the Phone, Drivers are Willing to Risk Getting a Ticket," Sep. 2, 2003.

* cited by examiner

*Primary Examiner*—Lewis West
(74) *Attorney, Agent, or Firm*—Kelley Drye & Warren LLP (57) ABSTRACT

A method and system for preventing an operator of a vehicle from using a handheld wireless communication device without a hands-free communication device associated therewith when the vehicle is in motion.

16 Claims, 7 Drawing Sheets

FIG. 5

METHOD FOR AUTOMOBILE SAFE WIRELESS COMMUNICATIONS

CROSS-REFERENCE TO RELATED APPLICATIONS

This application is a continuation application of U.S. patent application Ser. No. 10/673,725, filed Sep. 29, 2003 now U.S. Pat. No. 7,065,349. The disclosure of such application is hereby incorporated by reference in its entirety where appropriate for teachings of additional or alternative details, features, and/or technical background, from which priority is asserted.

BACKGROUND OF THE INVENTION

1. Field of Invention

The invention described and claimed herein relate to methods and systems for wireless communications. Specifically, they relate to methods and systems that prevent a handheld wireless telecommunication user from using a wireless telecommunication device in situations that would create safety hazards for the user or the general public.

2. Discussion of Related Art

Handheld wireless communication technology has come a long way since the 1980s. A handheld wireless communication user in the early days of handheld wireless communication had to carry a handheld wireless communication device in a bag. Today, handheld wireless communication devices are not only compact and stylish but also capable of much more than their bulky predecessors. The development of digital handheld wireless communication technologies increasingly facilitate variety of handheld wireless communication devices to communicate voice, data, or both simultaneously via different networks including the Internet.

One of the most popular handheld wireless communication devices is the wireless telephone. While the advancement of relevant technologies has greatly enabled flexible application of wireless telephones, such ubiquitous use of wireless telephones has also created new safety hazards. This is true of other handheld wireless communications devices, e.g., without limitation, PDAs/mobile PCs. For example, the use of handheld wireless communication devices by drivers of automobiles has been directly correlated with an increasing number of automobile accidents. The use of an handheld wireless communication device in a moving vehicle not only requires the use of one or both of the driver's hands on occasion, but also diverts the driver's attention from driving thereby delaying response time to prevent avoidable accidents.

The problem associated with the use of handheld wireless communication devices has become increasingly significant. It has reached the point that serious concerns are raised regarding the safety of both the driver as well as the general public. Some states within the United States and other countries have enacted, or are considering the enactment of legislation banning the use of handheld wireless communication devices by operators of moving vehicles. Even with enactment of these jurisdictions, many operators of vehicles are willing to risk being ticketed recognizing that the law is difficult and costly to implement.

The problem of operators of moving vehicles employing handheld wireless communication devices without a hands-free communication device is expected to worsen progressively. The latter is expected in part based on the new trend of implementing mobile computing offices to facilitate the demand that an individual be made available 24 hours a day/seven days a week and a substantial increase in the number of handheld wireless communication device sales. Consequently, government agencies and the automotive industry are seeking a solution to this problem.

BRIEF DESCRIPTION OF THE DRAWINGS

The invention claimed and/or described herein is described in terms of exemplary embodiments. These exemplary embodiments are described in detail with reference to drawings, which are part of the description of the invention. These embodiments are non-limiting exemplary embodiments, in which like reference numerals represent similar structures throughout the several views of the drawings, and wherein:

DETAILED DESCRIPTION OF THE INVENTION

The invention is further described in detail taking reference to the figures illustrating the systematic arrangement for controlling communication with a wireless handheld device while driving a vehicle moving at higher than a threshold speed, or at any speed above zero (in any direction).

Figure 1A:
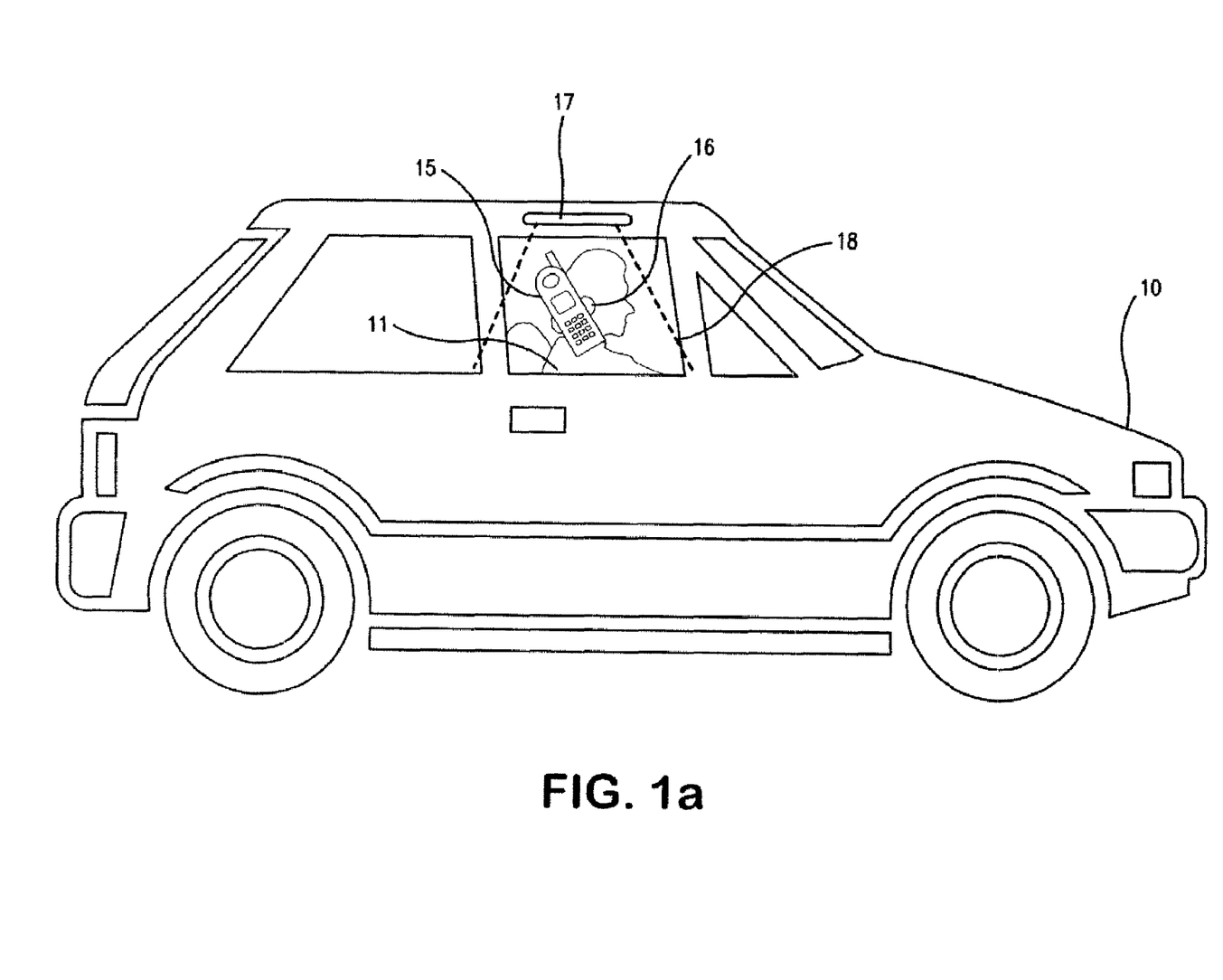
FIG. 1(a) depicts an exemplary partial breakaway diagrammatic side view of an automobile with an arrangement to ensure safe wireless communications, according to a first embodiment of the present invention.

FIG. 1(a) depicts an exemplary partial breakaway diagrammatic side view of an automobile with an arrangement to ensure safe wireless communications, according to a first embodiment of the present inventions. In FIG. 1(a), an operator 11 is in control of a movable vehicle 10 and is in possession of a handheld wireless communication device 15. The movable vehicle 10 may correspond to a vehicle that is movable such as an automobile, a truck, a train, a bus, a boat, an airplane or a motorcycle. The handheld wireless communication device 15 may be, for example (without limitation) a wireless cellular phone, a PDA with wireless capabilities, or a mobile personal computer.

Figure 1B:
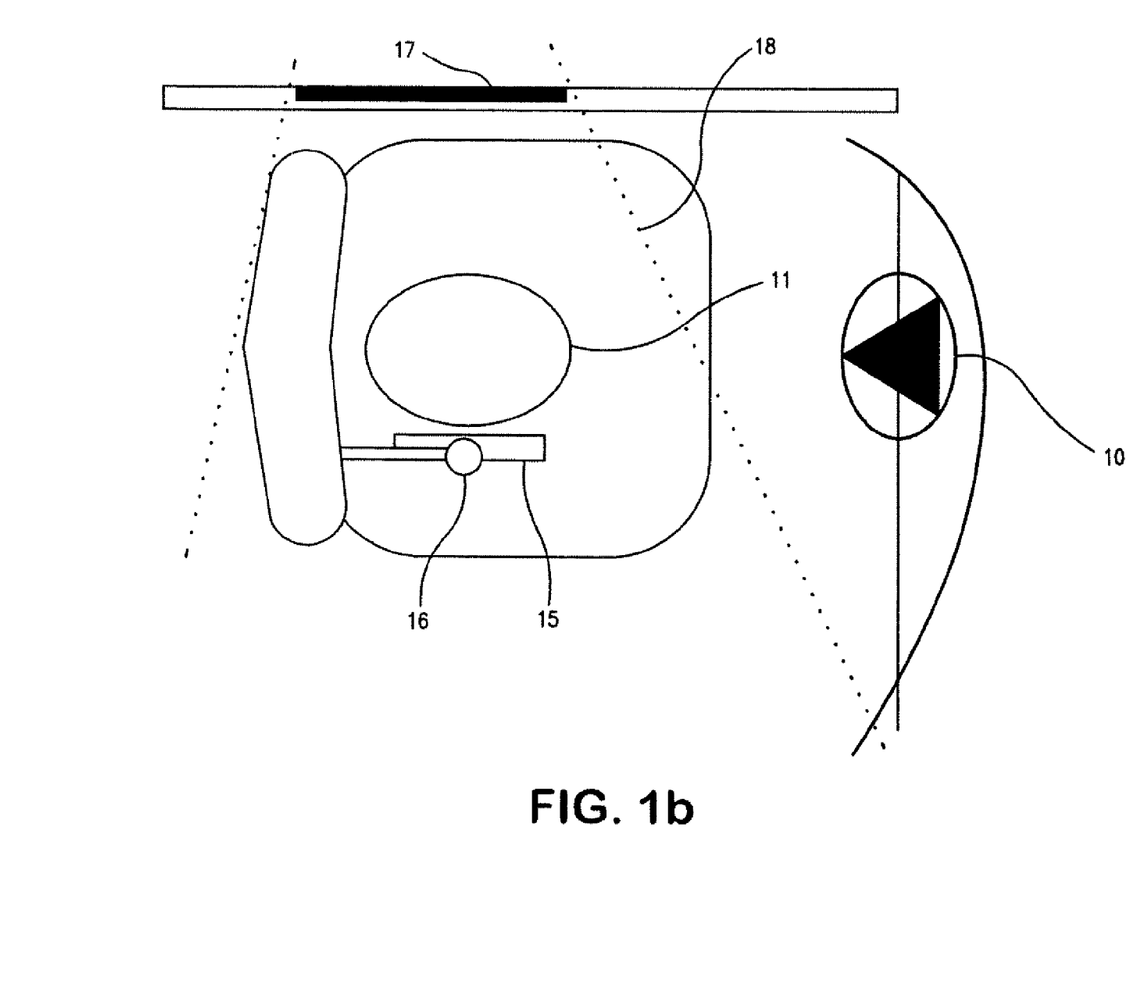
FIG. 1(b) depicts an exemplary partial aerial view of an automobile with an arrangement to ensure safe wireless communications, according to the first embodiment of the present invention.

FIG. 1(b) depicts an exemplary partial aerial view of an automobile 10 with an arrangement to ensure safe wireless communications, according to the first embodiment of the present invention. In the automobile 10, there is an emitter 17 which emits a narrow signal beam 18 around an area where the operator of the vehicle is located (e.g., the head area). In this depicted embodiment, the emitter 17 is installed on the side of the vehicle. For example, the emitter may be installed on the rim of the door frame. The narrow signal beam 18 is then transmitted towards the interior of the vehicle around the area of the operator's head.

The target area where the narrow signal beam is to reach may be within two to five feet from the emitter 17. The narrow signal beam 18 may be required to be no more than two feet in diameter. The narrow signal beam 18 may be intercepted by the handheld wireless communication device 15 through, for example, a port 16 on the handheld wireless communication device 15. The port 16 may correspond to a Bluetooth or an IR port, where a blue tooth system covers a diameter range of around 10 feet and an "IrDA" infrared red system covers less than 5-10 feet with a proper line of sight.

Bluetooth/IR communication ports may be made available on most of the currently available handheld wireless communicating devices such as, without limitation, cellular phones, PDAs, voice communicating PDA's and mobile PC's. Since many of the current and planned hand-held devices may be needed for performing a variety of other functions, such Bluetooth/IR ports on handheld communication devices according to this invention would remain available for such other functions as well.

Figure 2A:
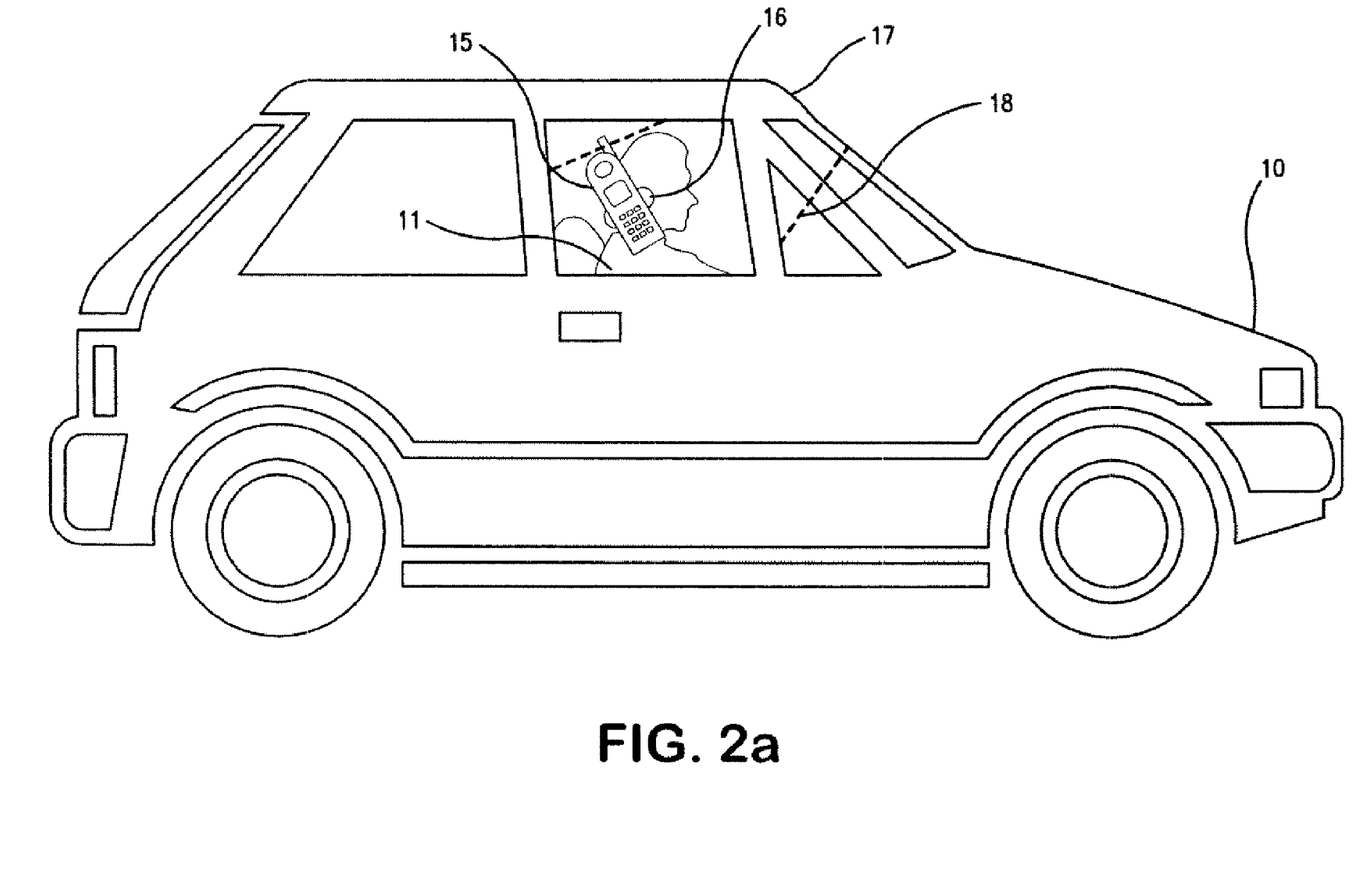
FIG. 2(a) depicts an exemplary partial breakaway diagrammatic side view of an automobile with an arrangement to ensure safe wireless communications, according to a second embodiment of the present invention.

FIG. 2(a) depicts an exemplary partial breakaway diagrammatic side view of an automobile with an arrangement to ensure safe wireless communications according to a second embodiment of the present invention. In this embodiment, the emitter 17 is installed at a different location. For example, the emitter 17 may be installed on the rim of the front window of the automobile 10. The target area of the emitter narrow signal beam 18 appropriately covers the same area: the operator's seat where the handheld wireless communication device 15 may be used.

Figure 2B:
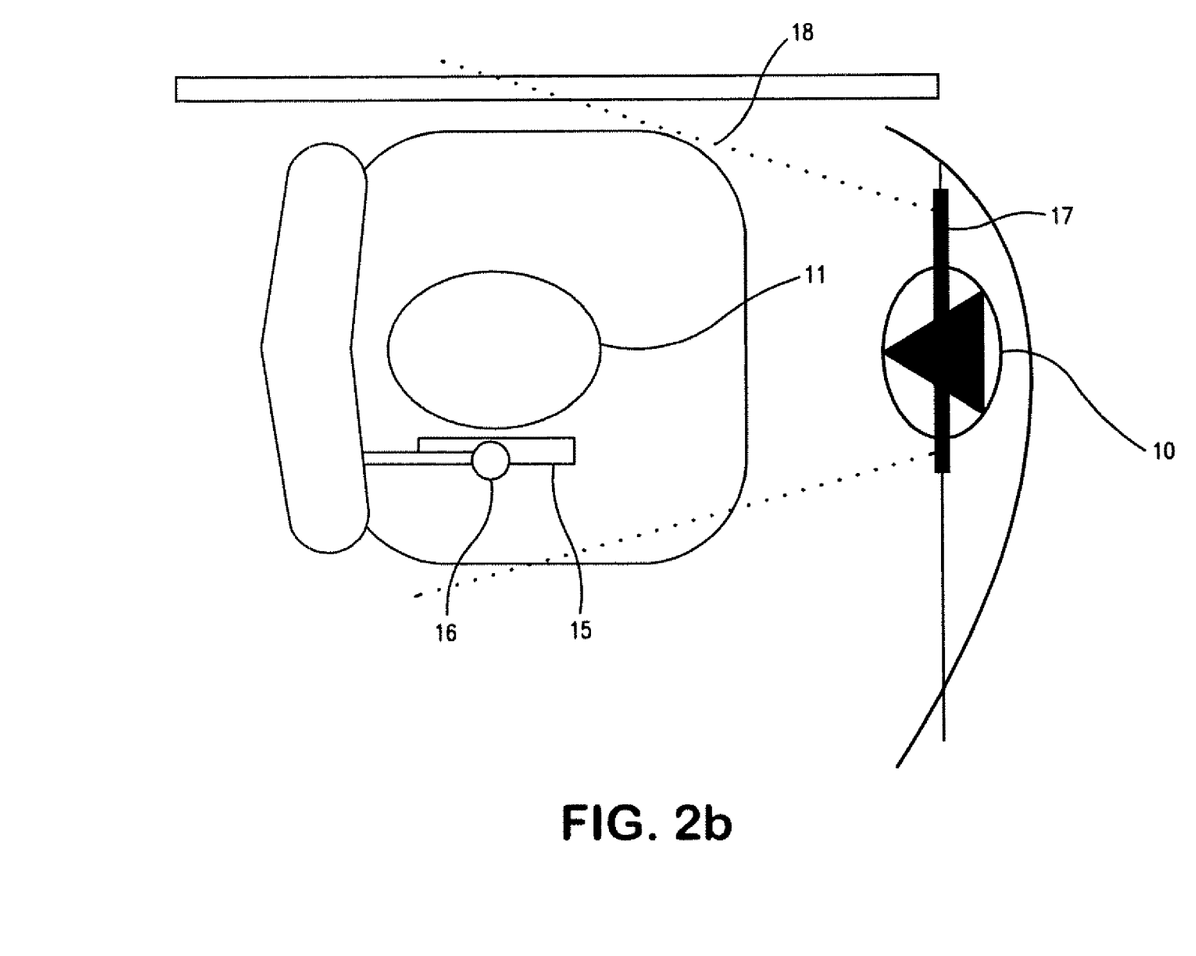
FIG. 2(b) depicts an exemplary partial aerial view of an automobile with an arrangement to ensure safe wireless communications, according to the second embodiment of the present invention.

FIG. 2(b) depicts an exemplary partial aerial view of the automobile 10 with the emitter 17 installed at an alternative position to ensure safe wireless communications, according to the second embodiment of the present invention. In this embodiment, the emitter 17 is located in front of the operator's seat and the narrow signal beam 18 is then transmitted towards the interior of the vehicle to cover an appropriate range around the operator's seat.

The arrangements depicted in either FIG. 1(a) or FIG. 2(a) constitutes a automobile safe wireless communication system (AS-WICS) to ensure safe wireless communications within a moving vehicle such as the automobile 10. The AS-WICS does not interfere with the functioning of the other devices in the vehicle. Signals used by the AS-WICS to ensure safe wireless communications may be designed in a manner that is designated to be specific to handheld communication devices located near the operator's area only.

In one embodiment of the invention, AS-WICS comprises a means for sensing when the vehicle is in motion, and may include a means, such as, without limitation, one or more sensors and software, to determine whether the vehicle velocity is greater than zero (in any direction), that the drive mode is selected, or that the park mode is not selected in the vehicle, or that the neutral mode is selected in the vehicle without the brakes fully engaged. The AS-WICS may also provide a mechanism for sensing, such as a sensor which is sensitive to a handheld wireless communication device signal, when the handheld wireless communication device is in use by the operator of the vehicle without an hands-free communication device being operatively associated, such as by wire or by transmission, to the handheld wireless communication device. The AS-WICS may also function to prevent the use of the handheld wireless device by an operator of the vehicle by, for example, transmitting a signal to the handheld wireless device which can control the operation of the handheld wireless device. The wireless means for sensing when the velocity of the vehicle exceeds a certain threshold, advantageously zero velocity, may be carried out by simple Bluetooth/Infrared technology as is described in greater detail below.

The Bluetooth wireless specification includes both link layer and application layer definitions for product developers which supports data, voice, and content-centric applications. Handheld wireless communication devices that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/set. The signal hops among 79 frequencies at 1 MHz intervals to give a high degree of interference immunity. Up to seven simultaneous connections can be established and maintained. Further details can be viewed at www.bluetooth.org or www.bluetooth.com.

The IrDA specifications, on the other hand, is intended for high speed short range, line of sight, point-to-point cordless data transfer -suitable for handheld communication devices. Since 1984, "h-DA Data" defines a standard for an interoperable universal two way cordless infrared light transmission data port. IrDA technology is already in over 300 million electronic devices including PC's, PDA's, cellular phones, cameras, toys, watches and many other mobile devices. Main characteristics of IrDA signaling include:

Range: Continuous operation between two contacts for at least 1 meter.
Bi-directional communication is the basis of all specifications.
Data transmission starting from 9600 kbps primary speed going up to 4.0 mbps.
Data packets are protected using CRC (from CRC 16 for speeds up to 1.152 mbps to CRC-32 at 4.0 mbps)

As described earlier, the port 16 on the handheld wireless communication device 15 is used to receive signals transmitted using BlueTooth/IrDA technologies. The IR ports on handheld wireless communication devices function in the following manner. When a handheld wireless communication device, e.g. (without limitation) the cell phone/PDA/mobile PC 15 is in use, the Bluetooth/IR port 16 is automatically activated. The Bluetooth/IR scanning beam is active when the automobile 10 is turned on irrespective of whether the handheld wireless communication device is in use. If the handheld wireless communication device is in use without attached to a hands-free communication device, the Bluetooth/IR port 16 in the handheld device will be triggered. A hands-free device with respect to a cellular phone, for example (without limitation) may be an earphone or a separate docket station which allows the handheld wireless device to function without the operator having to hold the handheld device.

The AS-WICS may function when the automobile 10 is in motion. It may detects a potential safety hazard related to the use of the handheld communication device while the vehicle is moving. Such a safety hazard may be predefined. For example, it may be determined that any use of the handheld wireless communication device in a moving vehicle without attached to a hands-free device is considered potentially hazardous to the safety to the operator, to others in the moving vehicle, and the general public. The AS-WICS detects such a pre-defined safety hazard and once detected, the AS-WICS may then interfere with the use of the handheld wireless communication device. For example, it may automatically terminate the use or only allow the usage when it is for emergency purposes.

To ensure safe use of the handheld wireless communication device in a moving automobile, the computer control system in the automobile 10 monitors the velocity of the automobile 10 to sense when the automobile velocity exceeds a pre-specified speed threshold. For example, such a pre-determined speed threshold may be set to zero velocity (in any direction). Whenever the sensed velocity of the automobile 10 exceeds this speed threshold, for example zero, at that moment in time the use of a handheld wireless communication device, e.g. (without limitation) cell phone/PDA/MOBILE PC 15, is considered to become a safety hazard. The speed threshold may also be set to values other than zero, such as a small yet steady speed after a specified duration. The use of the handheld device 15 when the automobile 10 exceeds the speed threshold is deemed to be a safety hazard.

Once it is determined that a safety hazard is present, the AS-WICS takes further action to eliminate the hazard. In such a case, the emitter 17 will emit a signal within the narrow beam 18 which will initiate call termination on the handheld wireless communication device 15. The termination may take effect immediately, or a warning and a short delay with a message communicated to the operator (to warn of the impending termination) before the operation of the handheld device is terminated. Thus, for example, the handheld wireless communication device 15 may indicate an incoming message and give a period of time for the operator to stop the vehicle in a safe location to respond to the incoming message. When there is an incoming message to the handheld device, an outgoing message may be transmitted after a set period of time to the caller to indicate that the operator is not able to take the call for a specified reason and time frame.

Figure 3:
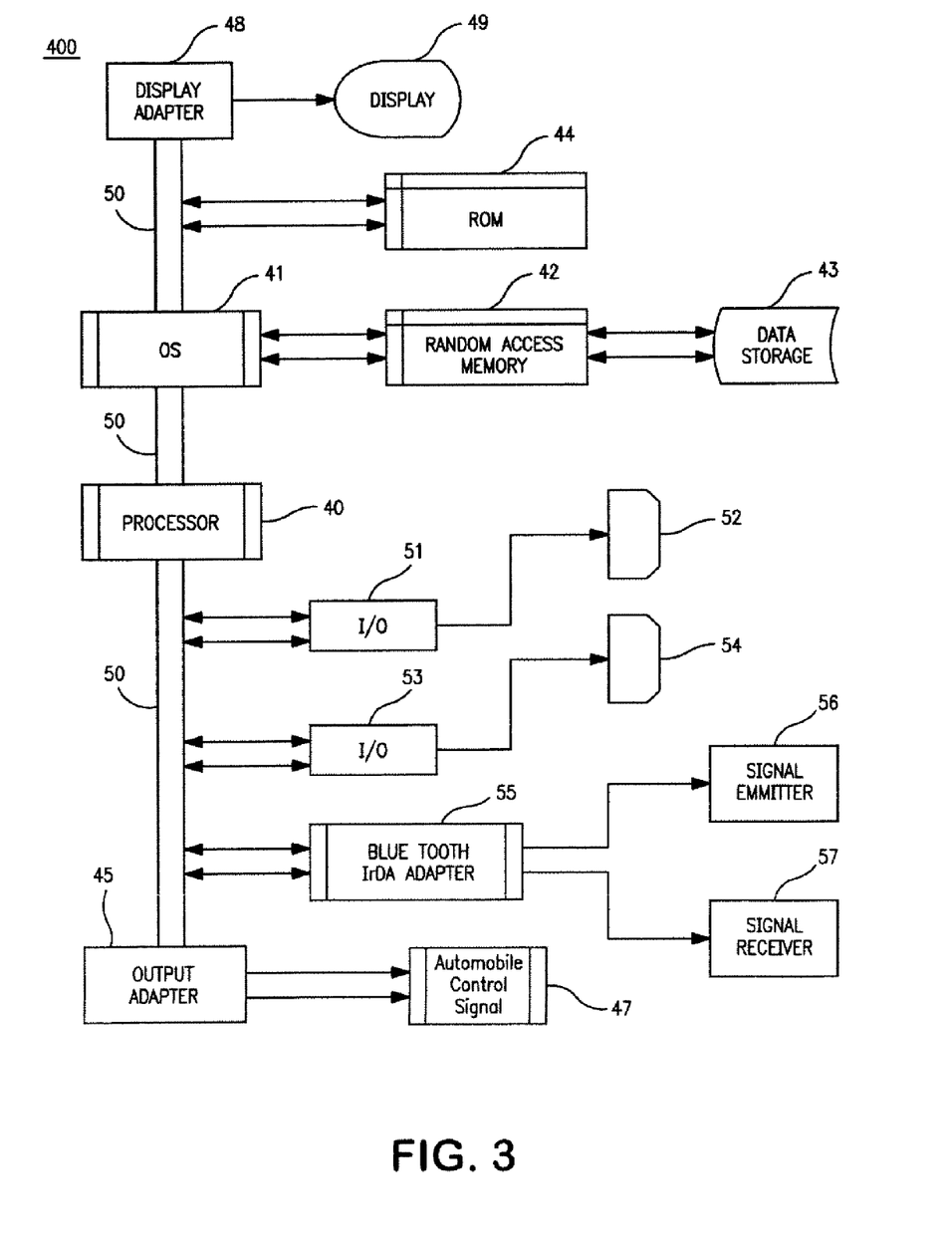
FIG. 3 depicts an exemplary functional block diagram of an on-board automobile computer control system configured to facilitate automobile safe wireless communication control, according to at least one embodiment of the present invention.

FIG. 3 describes a computer control system 400 that functions as an automobile onboard controller for various telecommunication functions, including the control of handheld wireless device 15 used in a moving automobile 10. A central processing unit 40 is provided and interconnected to various other components via a system bus 50. An operating system 41 running on the processor 40 provides control and may be used to coordinate the functions of the various components of the control system. The operating system 41 may be stored in Random Access Memory (RAM) 42, deployed in an automobile computer control system and may have a sufficient amount of memory such as 64 or 256 megabytes of storage space. Various application programs for different automobile monitoring and control functions may be stored in Read Only Memory (ROM) 44. Such stored application programs may be moved in and out of RAM to be executed to perform their respective functions.

Application programs deployed on the computer control system 400 may include the automobile safe wireless communication system (AS-WICS) constructed and configured according to different embodiments of the present invention. An automobile display 49 may be controlled through a display adapter 48 to provide information to the operator. The automobile computer control system 400 monitors a wide variety of automobile parameters through, for example, monitors 52 and 54 with sensors connected to the processor 40 through their respective I/O adapters 51 and 53.

Information monitored by the monitors 52 and 54 may be processed. Appropriate responsive control signals may then be generated and distributed through output adapter 45. According to the present invention, the control system may detect that the vehicle is in motion through sensors positioned at one or more locations of the vehicle. For example, a motion may be detected because it is sensed that the automobile velocity is greater than zero (in any direction). Motion may be deduced when it is detected that the park mode of the vehicle is not selected in the automobile 10. Motion of automobile 10 may be deduced when the driving mode is selected or a neutral mode is selected with brakes not fully engaged. Other alternatives to detect the motion of the automobile 10 may be employed which would be understood by one of ordinary skill in the art.

When the automobile 10 is in a driving mode (i.e., in motion), the use of the handheld wireless communication device 15 may be restricted. There may be different degrees of restriction, depending on, for example, how the handheld device is used and for what purposes. For example, use for non-emergency purposes may be terminated. In this case, a call termination signal Bluetooth/IR signal may be sent out from a Bluetooth/IR adapter 55 via Bluetooth/IR emitter 56. When the call termination signal is received at the Bluetooth/IR port 16 of the handheld wireless communication device 15 (as depicted in FIG. 1(a) and FIG. 2(a)), the operations of the handheld device may be terminated. The handheld wireless communication device may be loaded with software or otherwise configured such that receipt of the call termination signal causes only non-emergency numbers to be blocked. Alternatively, it may be determined, prior to sending the call termination signal, to see, for example with respect to a cell phone embodiment whether the use is associated with a list of pre-defined emergency designated telephone numbers. In such exceptional conditions, the termination may be excluded.

Figure 4:
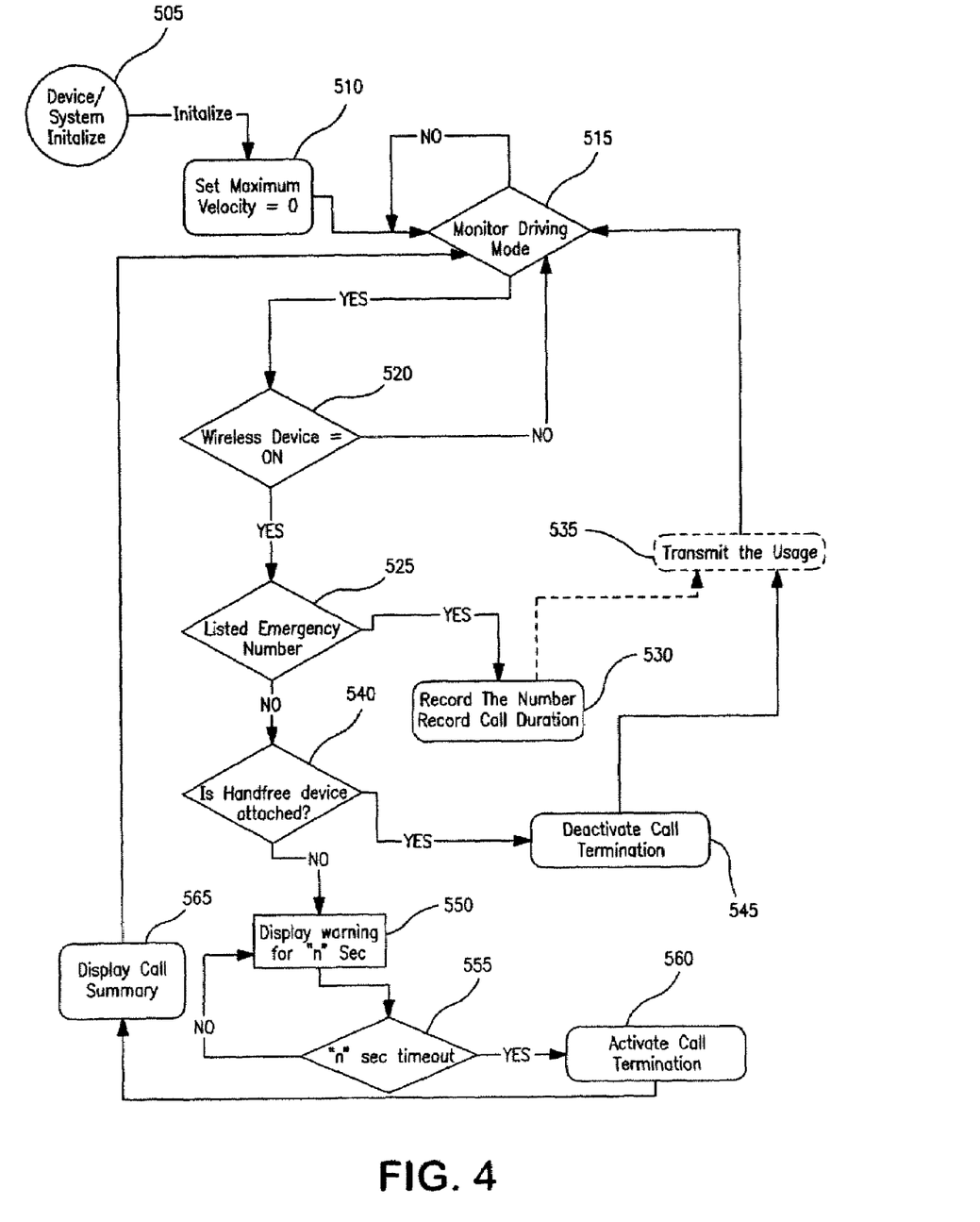
FIG. 4 is a flowchart of an exemplary process, in which an automobile safe wireless communication control system interacts with a handheld wireless communication device to ensure safety, according to at least one embodiment of the present invention.

FIG. 4 is a flowchart of an exemplary process, in which an automobile safe wireless communication control system interacts with a handheld wireless communication device to ensure safety, according to at least one embodiment of the present invention. The control system may perform initialization first at 505. For example, a speed threshold or a maximum velocity at which the handheld wireless device 15 may be used in the automobile is set at 510. The vehicle (or the automobile 10) may then be monitored, at 515, to detect whether the automobile 10 is in a motion with a velocity greater than the pre-determined maximum velocity. As discussed above, there may be different alternatives to detect the motion of the automobile 10. For instance, the vehicle control system may scan the driving mode of the vehicle to see whether the automobile 10 is not in park/neutral mode with brakes fully engaged or if it is in a driving mode.

If it is detected that the automobile 10 is in motion, further determinations may be made to decide whether the handheld wireless device is permitted to be used. For example in one embodiment, it may be examined to see whether the handheld wireless communication device is turned on at 520. If the handheld device is not turned on, the monitoring process returns to 515 to keep monitoring whether the automobile 10 is in motion. If the handheld device is turned on, determined at 520, then the AS-WICS may further check to see whether the handheld wireless device is actually in use.

If the handheld wireless device is in use, subsequent determination may be further made as to whether the current handheld wireless communication device use qualifies as an emergency use. In the context of a cellular phone, for example, the emergency use may be defined as a list of emergency telephone numbers, as discussed earlier. In this case, the user of the cellular phone and the service provider that provides the wireless communication services to the cellular phone are permitted to define, agree, and store a set of emergency numbers such as 911, EMS and Fire services. Such a list of emergency phone numbers defines the scope of the emergency use of the handheld wireless device 15 and may be stored at a certain location from where they can be retrieved when needed. For example, such emergency numbers may be stored in the control system or in the handheld wireless communication device.

To determine whether the call is associated with emergency use, the calling or called numbers may be compared with such a list of emergency phone numbers before the call is terminated by the system. If the use is associated with an emergency use, the emergency call may then be monitored, at 530, including recording the emergency number involved and the duration of the emergency call. The monitoring of the emergency call continues until the termination of the call.

If the use of the handheld device is not an emergency use, a hands-free device scan process may be activated to detect, at 540, whether the handheld wireless device is associated with a hands-free device. If the determination is "YES", i.e., the handheld device is associated with a hands-free device, the call termination process is deactivated at 545. If the answer is "NO", i.e., the handheld device is not associated with (e.g. physically or by transmission link) to a hands-free device, then the use of the handheld device is considered to be a safety hazard. In this case, the AS-WICS may initiate a restriction procedure that terminates the use of the handheld device, or alternatively the handheld device receiving a signal from the AS-WICS may by programming means initiate a restriction procedure that terminates the use of the handheld device. Alternative termination procedures may be implemented. For example, in some embodiments of the invention, the AS-WICS may first warn the operator of the termination before the termination takes place. In other embodiments (not shown), the AS-WICS may simply terminate the use.

A pre-determined period of time may be enforced in a call termination procedure. For example, a number of seconds (e.g., n seconds) may be allowed as a grace period for use before the actual termination takes place or a number of seconds may be allowed for the operator to bring the car to a stop in order to employ the handheld wireless communication device. During this grace period, the user may be warned, at 550, that the call will be terminated in a defined time frame, and/or the caller may be notified that the user is in a moving vehicle and will be unable to take the call unless the vehicle is stopped. Such warning may be conveyed through conventional verbal warning, e.g. "This call will be terminated in 15 seconds unless you stop your automobile in a safe place and/or attach a hands-free device immediately". The warning may persist for the grace period, determined at 555, until the end of the grace period. Simultaneously outgoing message may be transmitted to a caller to indicate that the operator of the vehicle is not able to answer the call at the time. For instance, a message may be sent out to the caller, stating that "driver is driving the car without the earphone attached to the mobile communication device". At the end of the grace period, the call termination is activated, at 560, to terminate the use of the handheld device.

The Bluetooth/IR scanning beam may be activated once the automobile ignition is turned on. This may be irrespective of whether handheld wireless communication device is in use. When the handheld wireless communication device 15 is in use without hands-free communication device, the Bluetooth/IR port in the wireless communication device will be activated and the delay, as well as the "Call End" or "Call Termination", may then be carried out by a sequence in the device or at the service provider.

When the automobile's computer control system beams Bluetooth/IR signal to the handheld device, it may simultaneously trigger appropriate sub-systems to carry out warnings and termination of the call signal. The termination procedure may proceed without interruption unless the handheld wireless communication device is attached to a hands-free communication device. The termination procedure may be implemented as an application software deployed, for example, in the wireless communication device. Alternatively, the telecom service provider may be required to configure and to facilitate the update of the wireless communication device firmware and/or system applications.

Once the use of the handheld device is terminated (at 560), a call termination summary reporting procedure may be activated which may generate or display a call summary at 565. The AS-WICS may then proceed to 515 to continue the monitoring and termination process.

In some embodiments, the AS-WICS may be designed to reflect laws and regulations imposed by certain law enforcement authorities of the government. For example, penalties related to any use of handheld device causing potential safety hazard may be imposed and enforced through the telecom service provider. Specific parameters defining such prohibited use of handheld devices in moving vehicles may be specified by such authorities and implemented by the AS-WICS. Penalties may include civil sanctions or monetary penalties. For example, the authorities may require the service provider to report such prohibited use of handheld devices or require the service provider to charge a higher rate associated with such prohibited uses. Furthermore, the authorities may require the service provider to report the length of time related to such prohibited use of handheld devices. This is illustrated in the dotted line path in FIG. 4. When the use is considered as a safety hazard but it is related to an emergency use (hence, it is not terminated), the emergency number involved and the length of the use are recorded at 530 and subsequently transmitted from the handheld device to a service provider which may then forward such information to appropriate authorities or impose a penalty charge.

Other alternatives may also be provided (not shown in figures). For example, the AS-WICS may provide the operator of the vehicle using the handheld device the option to override the call termination. This option may be important in an emergency. In this case, when the AS-WICS warns the use of the call termination, the user may elect to override the warning and interrupt the call termination procedure. In this case, the use may be considered as an emergency use but the number of the associated call as well as the duration of the call may be recorded (at 530) and such recorded information may then be sent to the service provider who may accordingly impose penalty charges or report to the appropriate authorities.

The AS-WICS as described herein may be deployed in different forms. For example, it may be implemented as a stand-alone device and may be attached to a location inside, (or less advantageously outside) of the automobile 10. In this case, it may directly (by wire) or indirectly (wirelessly) communicate with the control system of the automobile 10. Alternatively, AS-WICS may also be implemented as part of the computer control system of the automobile 10. In this case, the AS-WICS is designed as a coherent part of the computer control system of the automobile 10.

Figure 5:
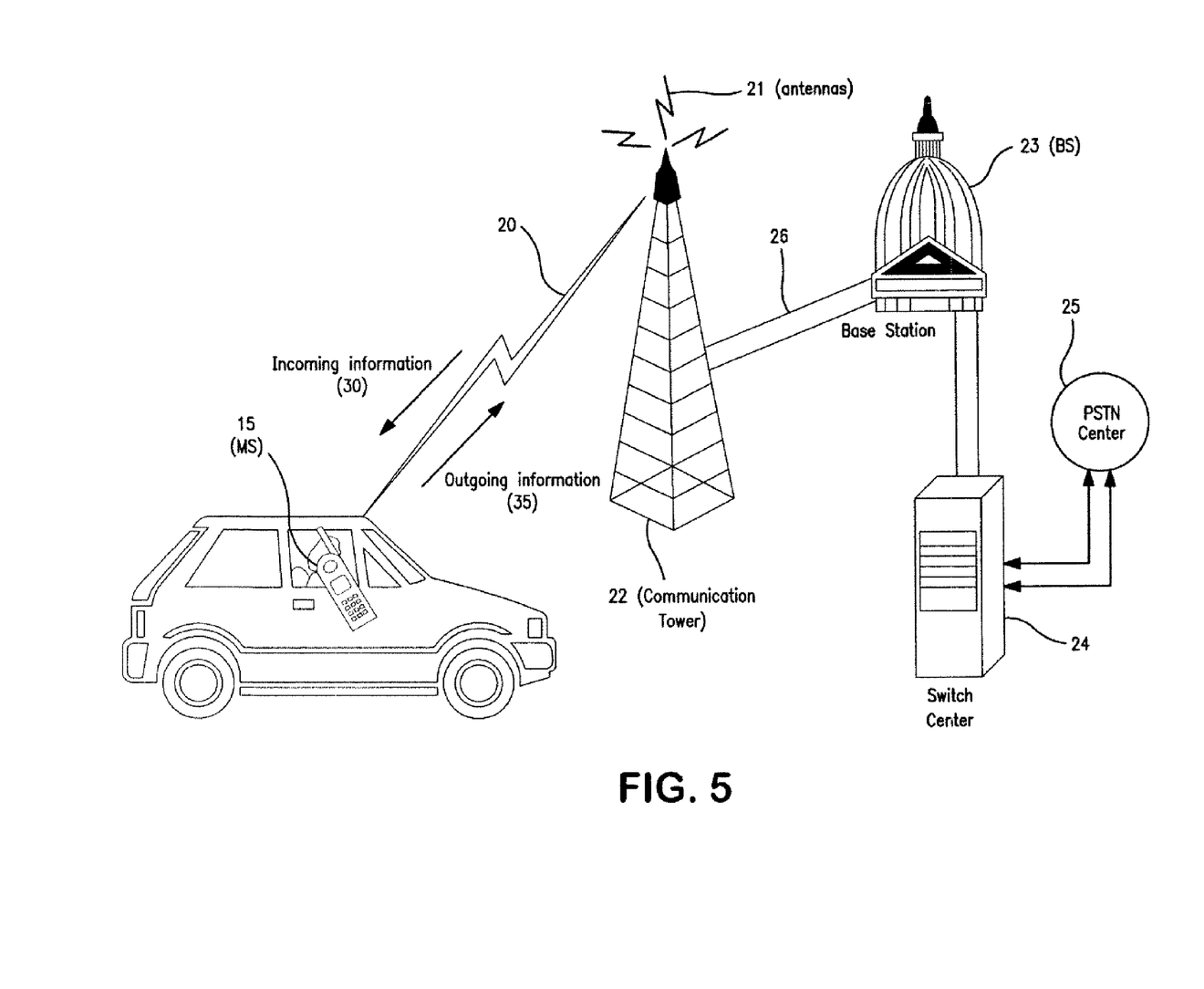
FIG. 5 is an exemplary architecture in which an automobile safe wireless communication control system cooperates with a telecom service provider to ensure safe wireless communications, according to at least one embodiment of the present invention.

FIG. 5 depicts an exemplary architecture in which the AS-WICS is deployed in an automobile to ensure safety in a wireless network, according to at least one embodiment of the present invention. A simplified typical handheld wireless device, e.g., without limitation, a cell phone/PDA/mobile PC 15, is used in the automobile 10. Through the communication tower 22, a base station 23, and a switching center 24, the handheld wireless communication device 15 transmits/receives information through a Public Switched Telephone Network (PSTN) 25. There are established channels among different components of the network. For example, the handheld wireless device 15 is connected via wireless air interface transmission paths 20 to the receiving/transmission antenna 21 at site 22. It should be understood that each illustrative cell site 22 will have many handheld wireless devices 15 with wireless connectability to their respective site. The base station 23 may be respectively associated with site 22 for RF signal transmitting/receiving via the air interfaces 20 to the handheld wireless device, e.g., without limitation, cell phone/PDA/mobile PC 15. The base station 23 is connected to the mobile switching center 24. This mobile switching center 24 may have a plurality of wireless devices connected to it. The switch center 24 may operate to control the channel connections, by switching into and out of the PSTN 25, those calls originated or terminated at the handheld wireless device. Switching center 24 connects channels from handheld wireless device, e.g., without limitation, cell phone/PDA/mobile PC 15 and others into the PSTN 25.

When there is incoming information 30 designated to the handheld device 15, the incoming information 30 is forwarded from the communication tower 22 to the mobile station or handheld device 15. When it is detected that the use of the handheld device 15 in a given environment is hazardous, a call termination may take place. As a consequence of the call termination, an outgoing information 35 may be transmitted from the handheld device 15 via the wireless communication network (including the antenna 21, the communication tower 22, the base station 23, the switch center 24, and the PSTN 25). Such an outgoing information may be directed at the caller, indicating the operator is not able to answer the call. It may also be directed at the service provider to include information such as recorded emergency use (or override use) and the corresponding recorded length of such prohibited use.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method for preventing handheld wireless communication in a vehicle by an operator of said vehicle, said method comprising the steps of:
    determining whether the velocity of the vehicle exceeds zero velocity (in any direction) and whether and for how long the operator's handheld wireless communication device is in operation;
    restricting the operator's use of a handheld wireless communication device if the velocity of the vehicle is greater than zero unless a pre-defined exceptional condition exists;
    receiving information as to how long the handheld wireless communication device is in use while the vehicle is in motion;
    informing the operator of the moving vehicle that the operation of the handheld wireless communication device may be automatically terminated after a pre-determined period of time; and
    actually terminating the operation of the handheld wireless communication device after the pre-determined period of time has run out.

2. The method according to claim 1, wherein the handheld wireless communication device comprises: a cellular phone; a PDA; or a mobile personal computer.

3. The method according to claim 1, wherein the vehicle comprises: an automobile, a truck, a bus, a train, a tractor, a crane, a 2-or 3-wheel conveyance, a motorcycle, or a floating device such as a boat, a ship, or an airplane.

4. The method according to claim 1, wherein said step of determining the velocity of the vehicle includes sensing through a wireless means.

5. The method according to claim 4, wherein said wireless means comprises:
    a blue tooth means; or
    an infrared means.

6. The method according to claim 1, wherein the pre-defined exception condition comprises use of the handheld wireless communication device for emergency purposes.

7. The method according to claim 6, wherein the emergency purpose is comprised of a list of emergency designations.

8. The method according to claim 7, wherein an emergency designation comprises an emergency telephone number.

9. The method according to claim 8, wherein the emergency telephone numbers are pre-stored in one of:
    a control system installed in the moving vehicle and configured to restrict the use of the handheld wireless communication device when a safety hazard exists; and
    the handheld wireless communication device.

10. The method according to claim 1, wherein the step of restricting the operator's use of a handheld wireless communication device comprises:
    sending a control signal to where the operator of the moving vehicle as well as the handheld wireless communication device are located;
    where the handheld wireless communication device may intercept said control signal; which control signal may terminate the operation of the handheld wireless communication device.

11. The method according to claim 1, wherein the use of the handheld wireless communication device comprises at least one step of:
    receiving incoming communication information; or
    transmitting outgoing communication information.

12. The method according to claim 1, wherein the wireless communication means comprises:
a blue tooth communication means; or
an infrared communication means.

13. The method according to claim 1, wherein the control signal is transmitted when use of the handheld wireless communication device by the operator of the vehicle is considered a potential safety hazard.

14. The method according to claim 13, wherein the potential safety hazard is present when the current operating environment satisfies a condition wherein:
the handheld wireless communication device is turned on in the moving vehicle in a position in the vehicle associated with the operator of the vehicle;
the detected velocity and time span the moving vehicle exceeds zero; and
the handheld wireless communication device is not attached to a hands-free communication device.

15. The method according to claim 1, wherein the handheld wireless communication device comprises: a cellular phone, a PDA, or a mobile personal computer.

16. The method according to claim 1, wherein said step of restricting the operation of the handheld wireless communication device in accordance with the control signal is not performed if a pre-defined exception condition exists.

* * * * *